United States Patent
Park et al.

(10) Patent No.: US 7,321,975 B2
(45) Date of Patent: Jan. 22, 2008

(54) METHOD FOR CONTROLLING POWER SUPPLY TO FUNCTION MODULES SELECTIVELY BASED ON FUNCTION MODULES NECESSARY FOR PREDETERMINED PROGRAM EXECUTION IN MOBILE DEVICE

(75) Inventors: Hong-chan Park, Suwon (KR); Han-sub Park, Anyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 658 days.

(21) Appl. No.: 10/763,225

(22) Filed: Jan. 26, 2004

(65) Prior Publication Data

US 2004/0150661 A1    Aug. 5, 2004

(30) Foreign Application Priority Data

Jan. 29, 2003    (KR) .................... 10-2003-0005934

(51) Int. Cl.
 *G06F 1/32* (2006.01)
(52) U.S. Cl. ..................... 713/324; 713/320
(58) Field of Classification Search ............... 713/320, 713/324

See application file for complete search history.

(56) References Cited

U.S. PATENT DOCUMENTS 5,521,854 A * 5/1996 Kadowaki et al. .......... 713/321
6,006,285 A * 12/1999 Jacobs et al. ................ 710/14
6,266,714 B1 * 7/2001 Jacobs et al. ................ 710/14
6,349,386 B1 * 2/2002 Chan ......................... 713/323
6,631,469 B1 * 10/2003 Silvester ...................... 713/2
6,735,455 B2 * 5/2004 Naito et al. ................ 455/574
6,865,621 B2 * 3/2005 Iwata .......................... 710/20
6,931,555 B2 * 8/2005 Osborn ...................... 713/320
6,996,731 B1 * 2/2006 Obitsu ....................... 713/324
7,130,994 B2 * 10/2006 Lin et al. ...................... 713/1

* cited by examiner

*Primary Examiner*—Chun Cao
(74) *Attorney, Agent, or Firm*—Staas & Halsey LLP

(57) ABSTRACT

A mobile device having a power control function. The mobile device having the power control function includes a plurality of function modules, a control unit, incorporating a predetermined program for driving the plurality of function modules, for driving each of the plurality of function modules by the program corresponding to a control signal; a power control unit for receiving information on the program that is driven by the control unit and selectively supplying the power to each of the plurality of function modules based on the information. In accordance with the present mobile device, when driving a function module and a program provided in the mobile device, only the necessary function modules are supplied with power, thereby reducing unnecessary power consumption and extending the operation duration of the mobile devices such as PDAs, cellular phones, and notebook computers.

16 Claims, 5 Drawing Sheets

METHOD FOR CONTROLLING POWER SUPPLY TO FUNCTION MODULES SELECTIVELY BASED ON FUNCTION MODULES NECESSARY FOR PREDETERMINED PROGRAM EXECUTION IN MOBILE DEVICE

CROSS-REFERENCE TO RELATED APPLICATIONS

This application claims the benefit of Korean Patent Application No. 2003-5934 filed Jan. 29, 2003, in the Korean Intellectual Property Office, the disclosure of which is incorporated herein by reference.

BACKGROUND OF THE INVENTION

1. Field of the Invention

The present invention generally relates to mobile devices, and more particularly, to a mobile device having a power control function that controls the supply of power to unnecessary function modules when driving a specific program and/or function module in the mobile device and a method for the same.

2. Description of the Related Art

In general, mobile devices such as PDAs (Personal Digital Assistants), cellular phones, and notebook computers are readily portable, and hence can be used even when they are moving, while their operation duration depends on the size and capacity of their batteries. On the other hand, since the power consumption of LCDs (Liquid Crystal Displays), which are widely used as an input/output interfaces for mobile devices, usually account for 30 to 50% of the total power consumption, there have been attempts made to reduce the power consumption of the mobile device by switching the LCD to a stand-by state or by turning the LCD off when the mobile device is off for a certain period of time.

Figure 1:
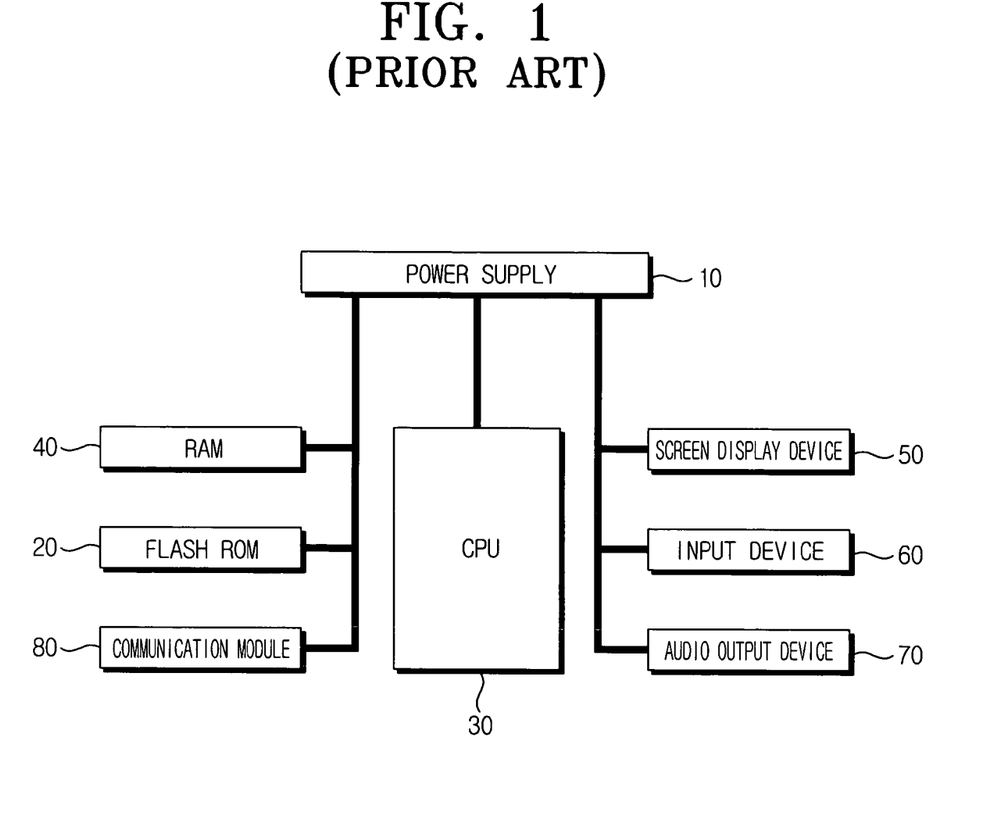
FIG. 1 is a block diagram illustrating a conventional mobile device configuration.

FIG. 1 is a block diagram illustrating a convention PDA configuration.

As illustrated in FIG. 1, the PDA includes a power supply 10, a flash ROM 20, a microprocessor (CPU) 30, a RAM 40, a screen display device 50, an input device 60, an audio output device 70, and a communication module 80.

The power supply 10 supplies power necessary for driving the mobile device. Usually, the power supply is a rechargeable battery formed of nickel-cadmium or nickel-hydrogen materials.

The flash ROM 20 stores an operating system and application programs for driving the mobile device.

The microprocessor 30 controls the overall operations of the mobile device, and executes the operating system and application programs stored on the flash ROM, to output an executed result to the display device or the audio output device, for example.

The RAM 40 is used for storing data in the mobile device. The mobile device has a convenient portability and a low power characteristic by using the RAM 40 as a storage medium instead of a bulky and heavy storage medium, such as hard disk drive. Since the RAM 40 has a property of erasing all of the data stored thereon if the RAM 40 is not supplied with power, only the RAM 40 is supplied with power even if the mobile device is turned-off, or the data is stored in the flash ROM 20 before the mobile device is turned-off.

The microprocessor 30 enables the screen display device 50 to display results of the application programs. At present, LCDs are mostly used a screen display, e.g., as the screen display 50, and account for substantial amounts of power consumption in the mobile device. Therefore, some conventional mobile devices, e.g., a PDA like that illustrated in FIG. 1, incorporate a function of causing the screen display device 50 to be turned-off by pressing a power saving button (not shown) provided on the input device, such as devices that allow musical files, such as MP3 files, to be reproduced. However, in addition to the screen display device 50, the mobile devices typically continuously power the communication module 80 and the audio output device 70, which consume large amounts of power, regardless of these components actually being in use. In the case of the communication module 80, since the communication module 80 communicates with a base station, at certain intervals to inform the base station of its own location, the power supply 10 continuously consumes power. Also, as for the audio output device 70, since the device 70 is provided with a predetermined amplifier for driving a headphone and a loudspeaker, the power supply 10 continuously consumes power even when the device 70 is not actually in use. Therefore, conventional mobile devices have a problem of the functional modules, which are not being operated by a user, causing power of a battery/power supply, incorporated in the mobile device, to be continuously consumed, thereby reducing the battery/power supply life of the mobile device.

SUMMARY OF THE INVENTION

Accordingly, it is an aspect of the present invention to provide a mobile device having a power control function for reducing power consumption and a method and recording medium for performing the same.

Additional aspects and/or advantages of the invention will be set forth in part in the description which follows and, in part, will be obvious from the description, or may be learned by practice of the invention.

To accomplish the above and/or other aspects and advantages, embodiments of the present invention provide a mobile device, including a plurality of modules, a control unit executing a predetermined program that uses at least one of the plurality of modules based on a program initiation control signal, a power supply providing power to drive the plurality of modules, and a power control unit receiving information on the program that is executed by the control unit and selectively, based on predetermined selection information, supplying the power to the at least one module.

The predetermined selection information may limit power consumption of the mobile device to only modules necessary for the predetermined program execution. Further, the predetermined selection information may include information on which modules are to be driven based on the information from the control unit of which program has been executed.

To accomplish the above and/or other aspects and advantages, embodiments of the present invention include a method for controlling power in a mobile device including a plurality of modules and a control unit, having a given program stored therein using at least one of the plurality of modules, including modifying a predetermined selection database to identify a module, of the plurality of modules, that is to be driven when the program is executed, identifying each module that is to be driven when the program is executed, based on the predetermined selection database, and supplying power to the identified modules.

Again, the predetermined selection database may includes information limiting power consumption of the mobile device to only modules necessary for the program execution.

Further, the modifying of the predetermined selection database may include identifying an additional module, in addition to at least one module of the plurality of modules previously indicated as being driven when the program is executed, that is to be driven when the program is executed.

To accomplish the above and/or other aspects and achievements, embodiments of the present invention include a recording medium, for a mobile device including a plurality of modules and a control unit having a given program stored therein using at least one of the plurality of modules, including a predetermined selection database identifying at least one module, of the plurality of modules, that is to be driven when the program is executed, such that upon an execution of the program only identified modules will be powered and driven by the mobile device to limit power consumption of the mobile device.

The predetermined selection database may include information for limiting power consumption of the mobile device to only modules necessary for the program execution. Further, the predetermined selection database is modifiable to identify an additional module, in addition to at least the one module of the plurality of modules previously indicated as being driven when the program is executed, that is to also be driven when the program is executed.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
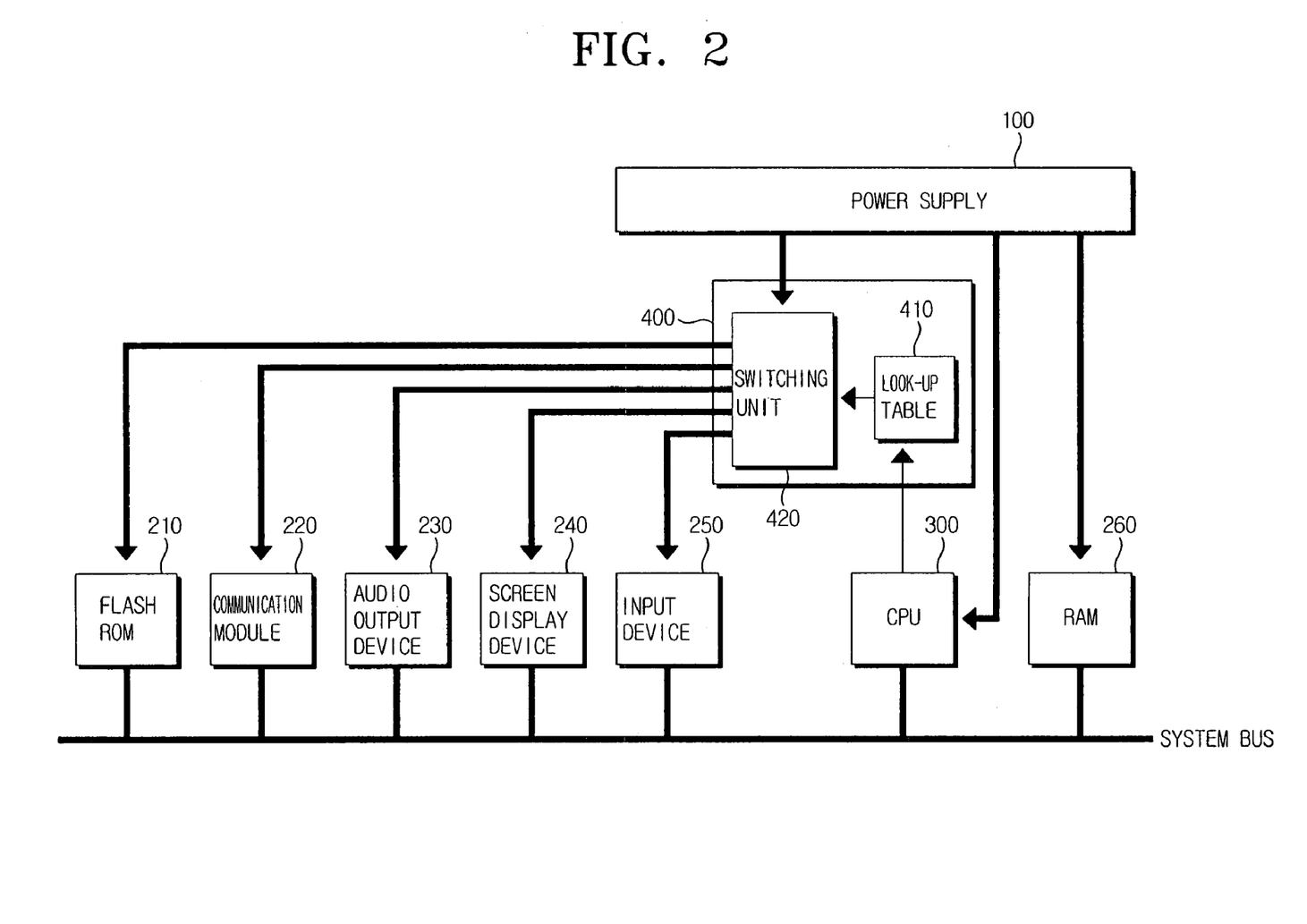
FIG. 2 is a block diagram of a mobile device having a power control function, according to an embodiment of the present invention.

FIG. 2 is a block diagram of a mobile device having a power control function, according to an embodiment of the present invention.

As illustrated in FIG. 2, a mobile device may include a power supply 100, function modules 210 through 260, a microprocessor 300, and a power control unit 400.

The power supply 100 supplies power to the mobile device. In general, the power supply is a rechargeable battery, with the capacity and charge duration of the power supply being limited by the size and bulk of the mobile device.

The function modules 210 through 260 are coupled to the microprocessor 300 via a system bus capable of transmitting/receiving data and a control signal, and include a flash ROM 210, a communication module 220, an audio output device 230, a screen display device 240, an input device 250, and a RAM 260.

The flash ROM 210 stores an operating system and application programs for driving the mobile device.

The communication module 220 has a networking function, including a cellular phone function and a wireless LAN function. The communication module 220 should communicate with a base station at certain intervals, when used as a cellular phone, and also generates a signal for detecting an access point at a certain interval in order to connect with the access point, even when attempting to use the mobile device in a wireless LAN.

The audio output device 230 is a function module that is required when the mobile device is used as a multimedia device. When the mobile device reproduces a musical file having a format such as MP3, the mobile device will incorporate an amplifier (not shown), having a predetermined output (for example, several tens mW to several hundreds mW), for outputting the reproduced musical file to earphones and/or loudspeakers.

Microprocessor 300, processing applications therein, enables the screen display device 240 to display the results of such processing. At present, the screen display device 240 is typically an LCD and includes a touch screen sensitive to external pressure or touch, i.e., the pressing of a stylus against the LCD screen.

The input device 250 interprets a control signal generated by a setting key (not shown) provided in the mobile device or a control signal inputted from the screen display device 240, having the touch screen, and outputs the corresponding control signal to the microprocessor 300.

The RAM 260 is used for storing data in the mobile device. The mobile device is conveniently portable and has a low-power characteristic because the bulky and heavy storage medium, such as a hard disk drive, has been replaced with the RAM 260. Since the RAM 260 typically erases all of the data stored thereon if the RAM 260 is not supplied power, at a minimum, the RAM 260 is supplied with power even if the mobile device is turned-off, or the data is stored in the flash ROM 210 before the mobile device is turned-off.

The microprocessor 300 controls the overall operations of the mobile device and executes the operating system and application programs stored on the flash ROM 210, to output an executed result to the screen display device 240 or the audio output device 230.

The power control unit 400 references the program processed by the microprocessor 300 and selectively turns-on/off function modules (for example, function modules 210 through 250). At this time, the power control unit 400 references the program and function module processed by the microprocessor 300, and as a result thereof, selectively turns-on/off only the program and function module processed by the microprocessor 300 and the function module associated therewith. For example, when the mobile device reproduces an MP3 file, since the function modules such as the communication module 220 and the screen display device 240 are not required for reproducing the MP3 file, these components are turned-off, thereby reducing power consumption in the mobile device.

Preferably, the power control unit 400 includes a look-up table 410 and a switching unit 420.

The look-up table 410 includes information on which function modules are driven when a particular program is driven by the microprocessor 300. For example, when a moving image is reproduced by a program for reproducing moving images, function modules such as the screen display device 240 and the audio output device 230 should be driven for reproducing the video and audio, whereas the communication module 220 may be regarded as a function module that is not necessary for the particular moving image reproduction. Accordingly, the look-up table 410 includes information on which function modules are necessary for driving the program for reproducing the moving image, i.e., information on whether the screen display device 240 and/or the audio output device 230 should be driven when driving the program reproducing the moving images.

Thus, the switching unit 420 selectively supplies power from the power supply 100 to the respective function modules 210 through 260 based on the information stored in the look-up table 410. As a consequence, only function modules necessary, or preferred, for driving the mobile device are turned-on, depending on the program driven by the microprocessor 300, thereby preventing unnecessary consumption of power.

The look-up table 410 may also include information on additional function modules that may be driven when driving the function modules controlled by the microprocessor 300. For example, when a user desires to place a call through the communication module, in order for the user to listen to another's voice, the mobile device is further required to drive the audio output device 230, in addition to the driving of the communication module. Thus, the look-up table 410 also includes information on the audio output device 230 that it is also driven when a user desires to place a call through the communication module. Accordingly, when the user places a call through the mobile device, the switching unit 420 supplies power to the communication module 220 and the audio output device 230 based on the information stored in the look-up table 410. In this example, the screen display device 240 and the input device 250 are not supplied with power.

Figure 3A:
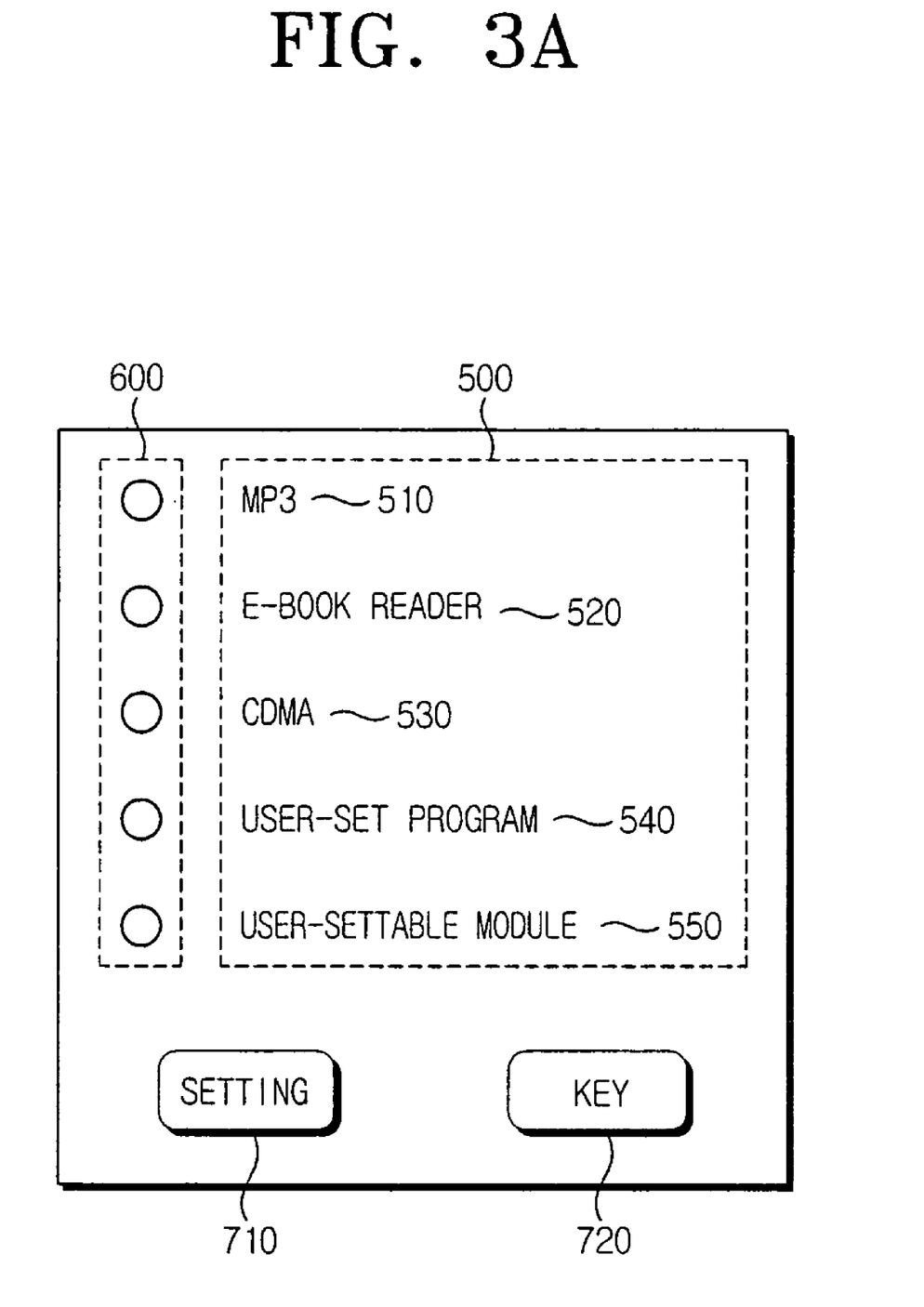
FIGS. 3A and 3B illustrate menu windows for setting the look-up table illustrated in FIG. 2, according to embodiments of the present invention.

FIG. 3A illustrates a menu window for setting the look-up table illustrated in FIG. 2, according to an embodiment of the present invention.

As illustrated in FIG. 3A, the menu window includes a setting menu 500 for a MP3 program 510, E-BOOK (Electronic BOOK) program 520, a user-settable program 540, and a user-settable module 550. The setting menus 510 through 550 each have a check box menu 600 for selecting at least one of the setting menus 510 through 550 on one side, a setting key 710, along the bottom, for selecting the setting menu, e.g., at least one of 510 through 550, selected in the check box menu 600, and a setting key 720 for further setting the user-settable program 540 and the user-settable module 550. A detailed explanation on these menus is set forth below.

The MP3 program 510 is a program for reproducing musical files having an MP3 format, stored in the flash ROM 210 in the mobile device, and is driven by the microprocessor 300. The E-BOOK program 520 is a program for displaying electronic documents, displayable on the screen display device 240. CDMA 530 designates a function module in charge of the communication function for using the phone and internet. The user-settable module 540 designates a menu for directly setting function modules that are required by a user for additional function modules added to the mobile device. The user-settable program 550 identifies a menu for directly setting function modules that are required by the user for additional programs installed in the mobile device. The setting key 710 recognizes the selected one of the function modules 510 through 550 and the selected one of the programs based on the check box menu 600, and the setting key 720 controls whether the respective function modules are to operate on the user-settable program 550 and the user-settable module 540.

Figure 3B:
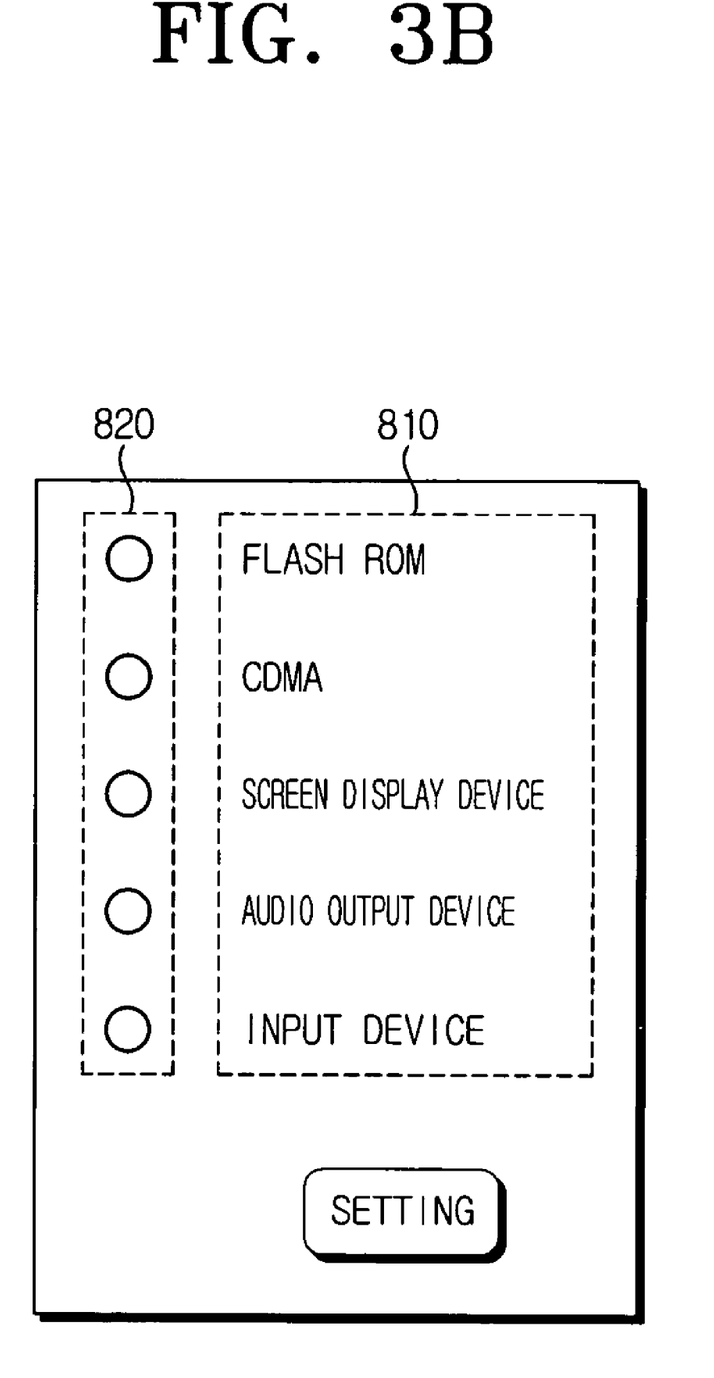

FIG. 3B illustrates a submenu 800 displayed on the screen display device by the setting key 720 illustrated in FIG. 3A, according to an embodiment of the present invention.

As illustrated in FIG. 3B, submenu 800 includes a menu for the flash ROM 210, the communication module 220, the audio output device 230, the screen display device 240, and the input device 250. The respective menus 811 through 815 have a check box menu 820 for selecting the menus 811 through 815, on one side. After additional program are installed in the mobile device, the function modules 811 through 815, required for driving the installed programs, are selected by the submenu 800, thereby avoiding the supply of power to unnecessary function modules.

Figure 4:
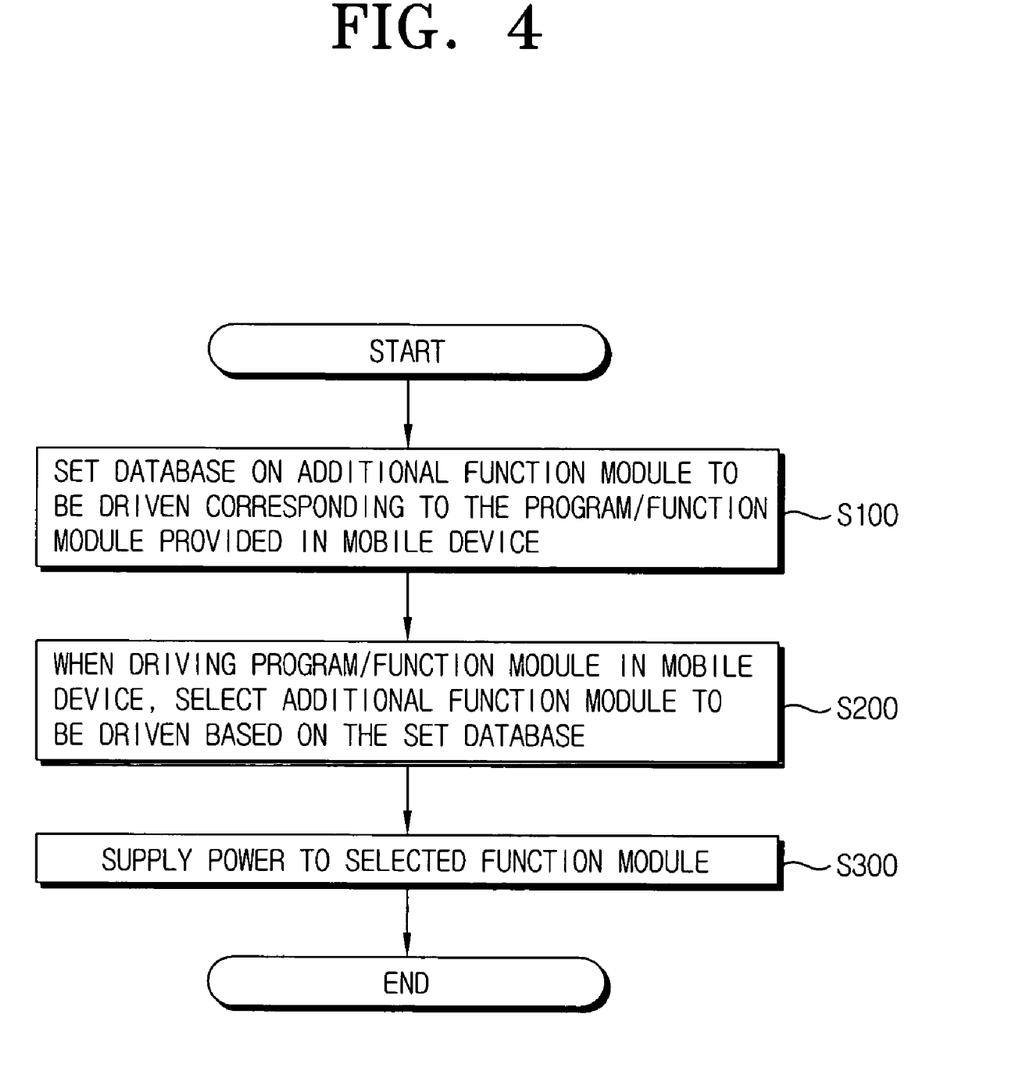
FIG. 4 is a flow chart explaining a method for controlling power in a mobile device, according to another embodiment of the present invention.

FIG. 4 is a flow chart explaining the method for controlling power in mobile device, according to an embodiment of the present invention.

At first, when driving programs and function modules, a database is set identifying which function modules should be driven based on which programs and function modules are executed (S100). The setting of the database can be performed based on the methods illustrated in FIGS. 3A and 3B. As described in FIG. 3A, by use of the check box menu 600, the function modules that are to be provided with power, out of all the available programs and function modules mounted on the mobile device, are selected. As described in FIG. 3B, when driving each of the programs and function modules in the submenu, additional function modules to be driven and provided with power can be set, including additional installed programs and additional mounted function modules, in addition to the previous or standard installed function modules and programs in the mobile device.

For example, when driving the E-BOOK program, the powered function modules include the screen display device 240 for displaying the contents of the E-BOOK, the flash ROM 210 for storing the E-BOOK and for outputting information of the same to the microprocessor 300, and the input device 250 for scrolling the electronic documents displayed on the screen display device 240. Accordingly, by storing the selective powering information for the function modules, as set by the menu 500 and the check box menu 600 in the look-up table 410, the above function modules can be selectively turned-on in driving the E-BOOK program.

Next, when driving the E-BOOK program in the mobile device, additional function modules 210, 240, and 250 can be selectively driven based on the database (S200), as the switching unit 420 is supplied with a database based control indicator to turn-on/off the selected function modules.

Finally, the switching unit 420 applies power, from the power supply 100, to the function modules 210, 240, and 250, based on the inputted database (S300) control indicator. Thus, as the mobile device drives the E-BOOK program, the communication module 220 and the audio output device 230 will not be supplied with power, thereby avoiding the consumption of unnecessary amounts of power.

As described above, embodiments of the present invention can reduce unnecessary power consumption by supplying power to only necessary function modules, and hence extend the operating duration of the mobile devices such as PDAs, cellular phones, and notebook computers. Additional embodiments at least include recordable media include a database representing the look-up table, for minimizing the power consumption of the mobile device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile device, comprising:
   a plurality of modules;
   a control unit executing a predetermined program that uses at least one of the plurality of modules based on a program initiation control signal;
   a power supply providing power to drive the plurality of modules; and
   a power control unit receiving information on the program that is executed by the control unit and selectively, based on predetermined selection information, supplying the power to the at least one module,
   wherein the power control unit comprises:
   a look-up table, as the predetermined selection information, having data for selectively identifying an on/off operation on a driving of respective modules, depending on the information from the control unit of which program has been executed; and
   a switching unit selectively performing the identified on/off operation of the power supplied to the respective modules according to the look-up table.

2. The mobile device of claim 1, wherein the predetermined selection information limits power consumption of the mobile device to only modules necessary for the predetermined program execution.

3. The mobile device of claim 1, wherein any one of the plurality of modules visually displays a result obtained by processing the executed program.

4. The mobile device of claim 3, wherein any one of the of the plurality of modules comprises a display device for the visual displaying of the result obtained by the processing of the executed program.

5. The mobile device of claim 1 further comprising a display device controlled by the control unit to display a menu window for setting the predetermined selection information.

6. The mobile device of claim 5, wherein the menu window comprises:
   a menu displaying the respective modules;
   a check box menu provided on one side of the displayed menu; and
   a setting menu selecting and modifying a value set in the check box menu for the selectively identifying of the on/off operation on the driving of respective modules.

7. The mobile device of claim 5, wherein the menu window comprises:
   a menu displaying the respective modules;
   a check box menu provided on one side of the displayed menu; and
   a setting menu selecting and modifying a value set in the check box menu.

8. The mobile device of claim 7, wherein the setting menu modifies which modules are to be powered when at least the predetermined program is executed.

9. A method for controlling power in a mobile device including a plurality of modules and a control unit, having a given program stored therein using at least one of the plurality of modules, the method comprising:
   recording to a predetermined selection database selectively identifying an on/off operation on a driving of respective modules, depending on which program, of a plurality of programs, is executed;
   identifying each module that is to be driven when the program is executed, based on the recorded predetermined selection database; and
   supplying power to the identified modules,
   wherein the supplying of the power comprises:
   referencing the recorded predetermined selection database as a look-up table to identify which modules are to be driven when the program is executed; and
   supplying power to the modules identified as being driven.

10. The method of claim 9, further comprising modifying the recorded predetermined selection database by identifying an additional module, in addition to the at least one module of the plurality of modules previously indicated as being driven when the program is executed, that is to be driven when the program is executed.

11. The method of claim 9, wherein the recorded predetermined selection database includes information for limiting power consumption of the mobile device to only modules necessary for the program execution.

12. The method of claim 9, wherein any one of the plurality of modules visually displays a result obtained by processing the executed program.

13. The mobile device of claim 12, wherein any one of the plurality of modules comprises a display device for the visual displaying of the result obtained by the processing of the executed program.

14. The method of claim 12, wherein the display of the result includes displaying a menu window for modifying the recorded predetermined selection database.

15. The method of claim 14, wherein the menu window comprises:
   a menu displaying the respective modules;
   a check box menu provided on one side of the displayed menu; and
   a setting menu selecting and altering a value set in the check box menu.

16. The method of claim 15, wherein the setting menu modifies which modules are to be powered when the program is executed.

* * * * *

UNITED STATES PATENT AND TRADEMARK OFFICE
CERTIFICATE OF CORRECTION

PATENT NO. : 7,321,975 B2 Page 1 of 1
APPLICATION NO. : 10/763225
DATED : January 22, 2008
INVENTOR(S) : Hong-chan Park et al.

It is certified that error appears in the above-identified patent and that said Letters Patent is hereby corrected as shown below:

Column 7, Line 34, before "plurality" delete "of the". (Second Occurrence)

Signed and Sealed this

Twenty-fourth Day of June, 2008

JON W. DUDAS
*Director of the United States Patent and Trademark Office*